March 22, 1966

M. L. KINER ETAL 3,241,439

PORTABLE MICROPROJECTOR

Filed July 15, 1963

INVENTORS
MANUEL L. KINER
JUSTIN C. GODINA
BY
Attorney

March 22, 1966   M. L. KINER ETAL   3,241,439
PORTABLE MICROPROJECTOR

Filed July 15, 1963   5 Sheets-Sheet 2

INVENTORS
MANUEL L. KINER
JUSTIN C. GODINA
BY
Attorney

INVENTORS
MANUEL L. KINER
JUSTIN C. GODINA

March 22, 1966    M. L. KINER ETAL    3,241,439
PORTABLE MICROPROJECTOR
Filed July 15, 1963                     5 Sheets-Sheet 4

INVENTORS
MANUEL L. KINER
JUSTIN C. GODINA
BY
*B. Shlesinger*
Attorney

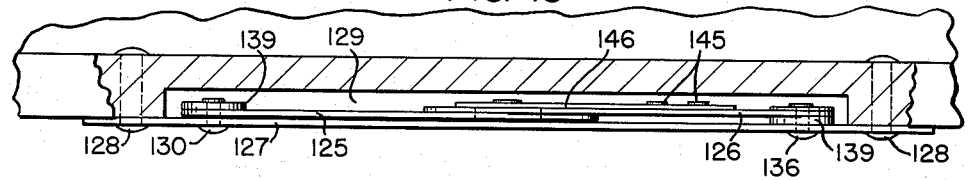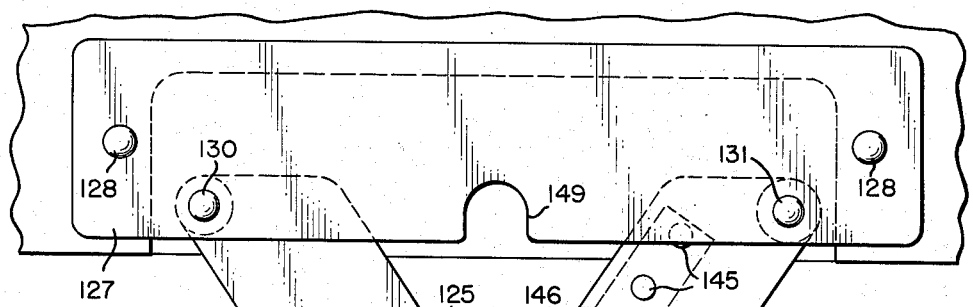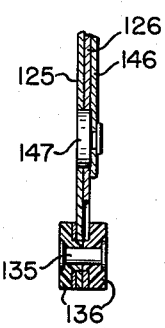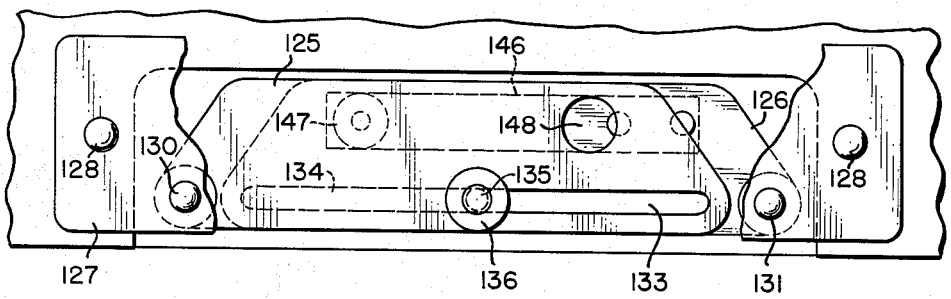

United States Patent Office 3,241,439
Patented Mar. 22, 1966

3,241,439
PORTABLE MICROPROJECTOR
Manuel L. Kiner and Justin C. Godina, Rochester, N.Y., assignors to Elgeet Optical Company, Inc., Rochester, N.Y., a corporation of New York
Filed July 15, 1963, Ser. No. 295,083
13 Claims. (Cl. 88—24)

This invention relates to a microprojector, and more particularly to a portable microscope having a carrying case with a built-in projection screen.

Microprojectors of the type described are used extensively in the field of education as visual aids for classroom and seminar lecturers. They are particularly handy, for instance, in the study of bacteriology, metallurgy or other subjects in which great reliance is placed upon the magnification and study of slides containing specimens or samples of the subject matter under consideration.

Conventional microprojectors are rather bulky, and where used for projecting onto screens, require separate screens that need storage space in addition to that required for the projectors themselves. Moreover, conventional microprojectors used in classroom study have either to be taken to the rear of the classroom to project across the room onto the screen, thus creating an inconvenience for the instructor who must shuttle back and forth between the screen and projector in the course of his lecture, or have to be put on a desk, and the pupils must then be called one by one to view the projected image—a time consuming and often disorderly procedure.

Common to substantially all prior microprojectors is the disadvantage that the intense heat emitted by the projection lamp tends to overheat the slide being viewed, thus tending to kill live specimens carried by the slides. Also, in prior microprojectors special adjustments are required for viewing wet slides. The stage has to be changed from vertical to horizontal position to prevent drip from the wet slides. Most microprojectors heretofore have been provided with three different sets of lenses mounted on a turret for varying the magnification of the object being viewed. The range of variation in magnification is therefore limited, and variation can only be achieved by indexing the turret to bring the different lenses into operative position.

One object of this invention is to provide a microprojector and carrying case therefor which has a built-in collapsible projection screen that can be set up in seconds; and that is self-storing.

Another object of this invention is to provide a microprojector and carrying case therefor which is sturdy, and which, when in use, has a relatively low center of gravity, and a low silhouette that does not distract from the lecturer's presentation.

Another object of the invention is to provide a microprojector whose stage can always remain horizontal for convenient projection of either fixed or live specimens.

Another object of the invention is to provide a microprojector and screen unit that is compact, lightweight and easily portable.

A further object of the invention is to provide a microprojector with which a low voltage projection lamp can be used and which is equipped with a built-in blower for cooling the lamp sufficiently to permit projection of live specimens.

Another object of the invention is to provide a portable microprojector unit in which a powerful, efficient blower can be incorporated for cooling the projection lamp, thereby to insure longer lamp life.

Another object of the invention is to provide a microprojector equipped with a zoom lens for giving continuously variable magnification without requiring rotation of a turret or change of objectives.

A still further object of the invention is to provide a microprojector unit with which three-way projection is possible, namely, on a conventional screen or white wall, on a rear projection screen that folds away completely within the innermost case, and on this same screen swung into horizontal position for tracing directly from the image on the screen.

Still another object of the invention is to provide a microprojector unit of the type described which is compact and convenient to use, but which nevertheless can be procured at a modest price.

Other objects of the invention will be apparent hereinafter from the specification and from the recital of the appended claims, particularly when read in conjunction with the accompanying drawings.

In the drawings:

FIG. 10 is an enlarged, fragmentary horizontal section of the cover in its open position, and showing the legs for supporting the cover in this position;

FIG. 11 is a fragmentary elevational view on the same scale as FIG. 10, of the open cover with its supporting legs lowered;

FIG. 12 is an elevational view similar to FIG. 11 but showing the supporting legs in folded position;

FIG. 13 is a sectional view taken along the line 13—13 in FIG. 11 and looking in the direction of the arrows.

Figure 14:
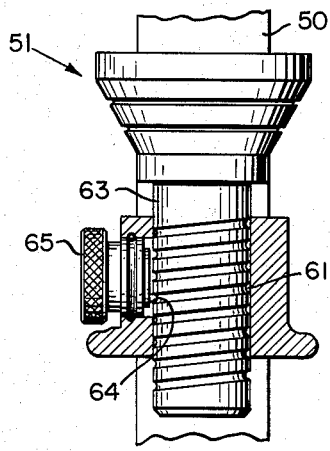
FIG. 14 is an enlarged section view taken along the line 14—14 in FIG. 6, looking in the direction of the arrows, certain of the parts being shown in full.

Referring now to the drawings by numerals of reference, 11 designates generally the microprojector carrying case, which comprises a bottom section or casing 12 that is adapted to rest on four rubber pads 13 secured at each of its four corners. Pivoted to the rear wall of the casing adjacent the upper edge thereof by means of two sets of conventional, separable hinges 14 is a shallow cover 15. For holding the cover closed there is riveted to the forward edge of the cover 15 a hook 16 which is adapted to be releasably engaged by a conventional, thumb-operated clasp 17 which is pivotally mounted on the front of the bottom section 12 of the case. A handle 18 is pivotally mounted on one side of bottom section 12 in a conventional manner to provide means for carrying the case 11; and a lug 19 on the cover seats in a socket in a plate 20 on the side of the bottom section 12 to prevent lateral shifting of the cover when it is closed.

Figure 5:
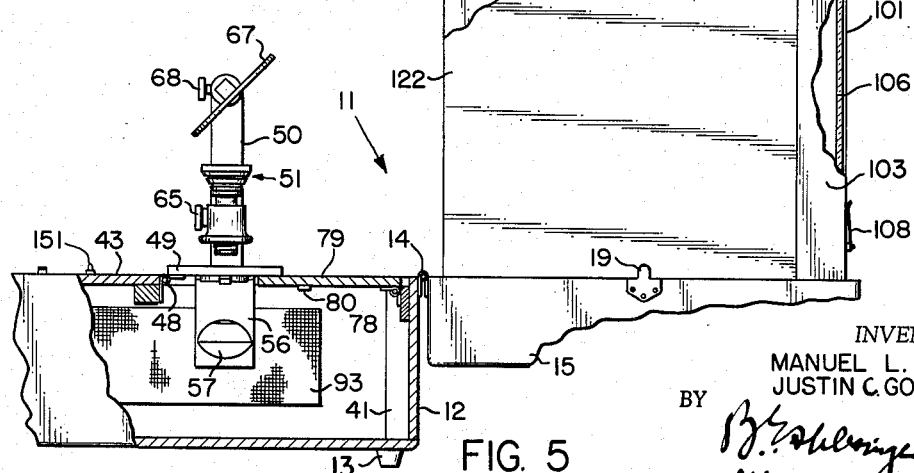
FIG. 5 is a side view of the whole unit on the same scale as FIG. 1, showing the cover in its open, horizontal position, and the microscope and projection screen raised to their operative positions.
Figure 4:
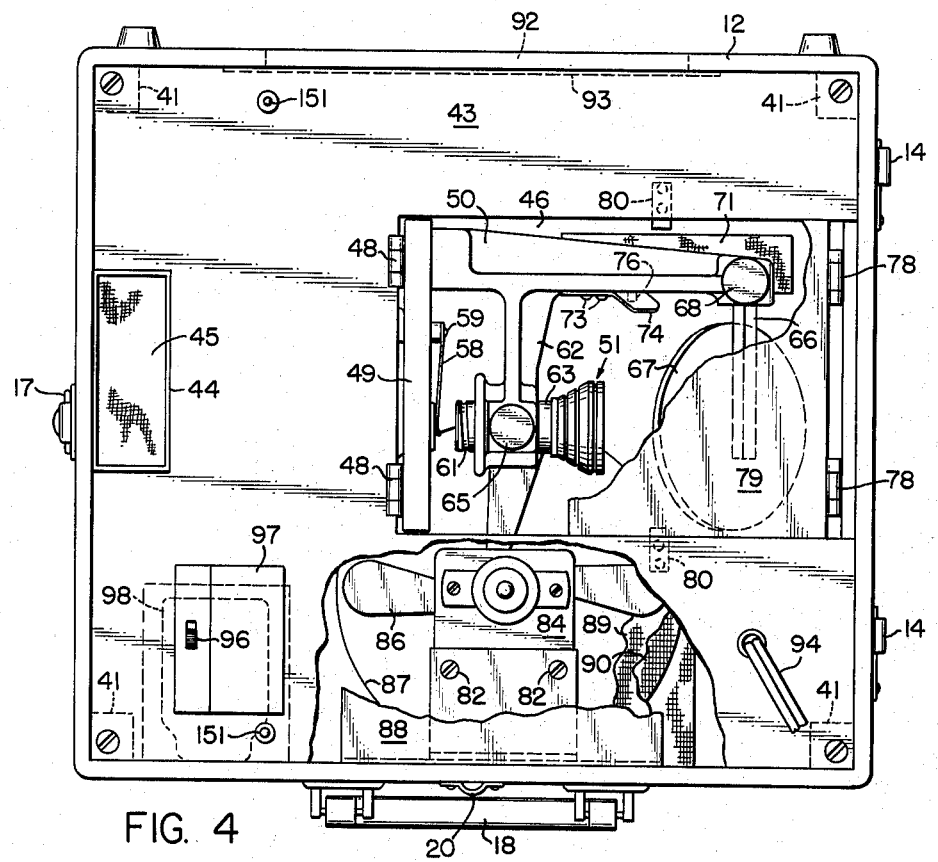
FIG. 4 is a plan view of the case on the same scale as FIG. 3, and with the cover removed, showing the parts of the microprojector stored in the bottom of the case, portions of the case being cut away.
Figure 3:
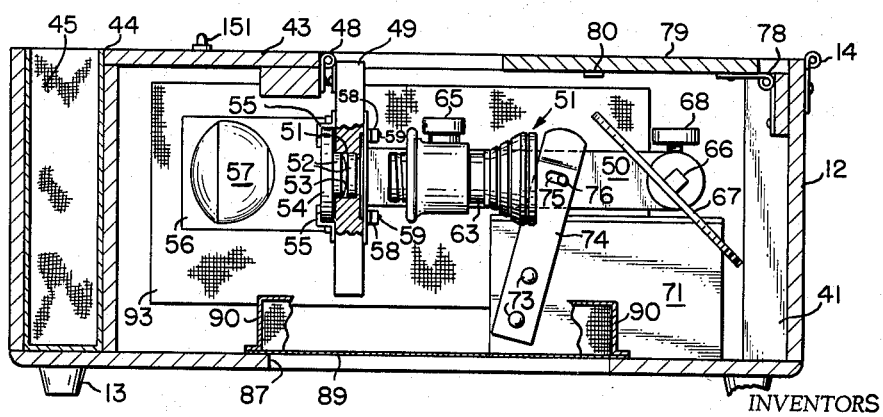
FIG. 3 is an enlarged side view of the bottom section of this case, its cover having been removed and parts of the case being cut away to show the parts of the microprojector contained therein.
Figure 6:
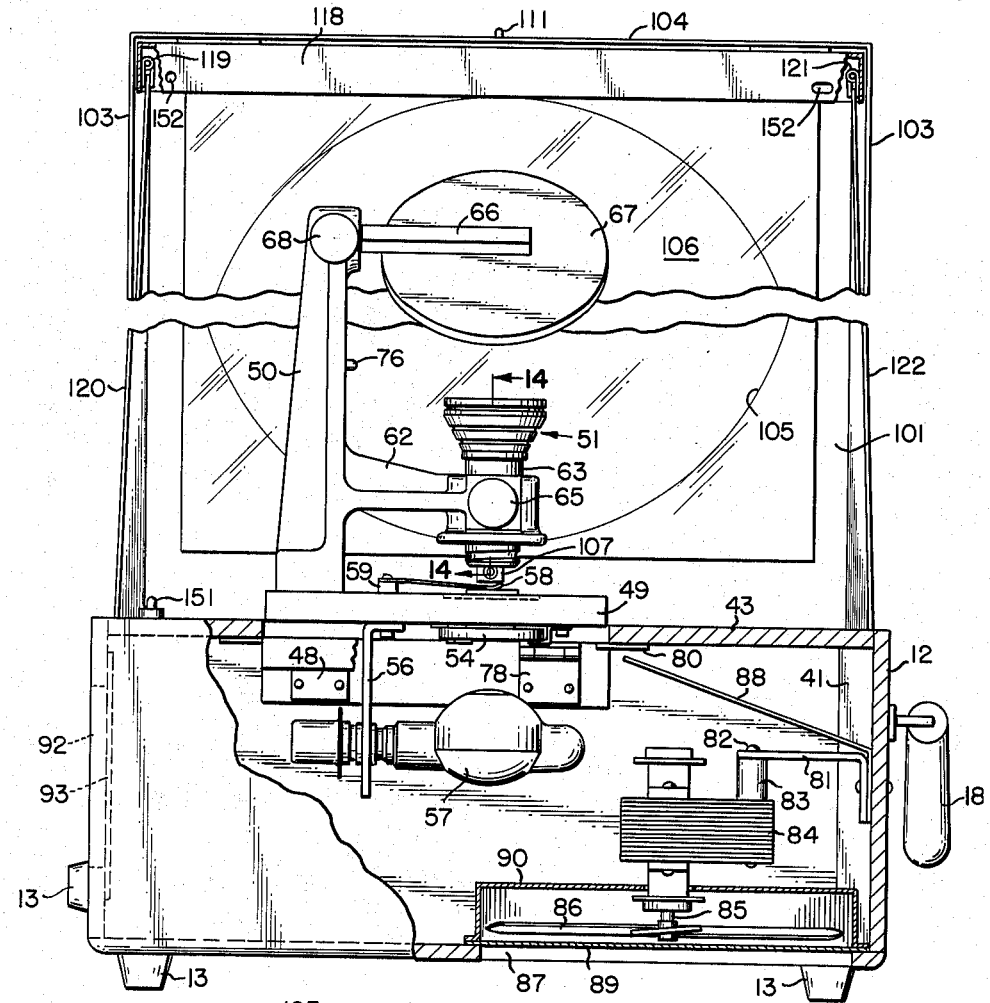
FIG. 6 is a front view of the case on the same scale as FIGS. 3 and 4, and showing the cover in its open, horizontal position, and the microscope and projection screen raised to their operative positions.

Mounted on posts 41 secured in the four corners of the bottom section 12 of case 11 is a rigid, rectangular plate 43 (FIGS. 3 to 5). This plate has therein a rectangular notch or recess 44 in which is mounted a container 45 for slides. The plate 43 is also notched to provide a large rectangular opening 46 (FIG. 4); and hinged at one side of this opening by hinges 48 to pivot about a horizontal axis is a microscope stage plate 49 on which a bracket 50 for a microscope or magnifying lens 51 is mounted. Hinges 48 permit pivoting plate 49 from a vertical position, in which the microscope 51 is enclosed in the casing bottom section 12 (FIGS. 3 and 4), to a horizontal position wherein the plate 49 extends parallel to the plate 43 and the microscope is in vertical, operative position (FIGS. 5 and 6).

Plate 49 has a central opening therethrough in which are mounted two pieces of heat-absorbing glass 52 (FIG. 3), which are axially separated by a spring washer 53. The dishes 52 and the spring washer 53 are secured in plate 49 by a heat-resisting glass 54, which is secured to the bottom of plate 49 by clamps 55.

Suspended by a bracket 56 beneath the underside of the stage plate 49 is a lamp 57. Lamp 57 is in registry with the opening in the plate 49 so that light therefrom will pass through the glass 54 and the filter discs 52 to illuminate a slide or the like disposed on the stage plate 49. At least two spring clamps 58 (FIGS. 3 and 4) are secured to the upper face of the stage 49 by screws 59 to hold a slide over the central opening in the stage plate.

Projecting laterally from bracket 50 is an arm 62 which is bored coaxially with the central opening in the plate 49 to hold a mount 63 for the lenses which constitute the microscope 51. The lens mount 63 is adjustable toward and away from the stage plate 49. A rotatable focusing stud 65 extends radially through arm 62, and on its inner end has an integral detent 64 (FIG. 14) which engages a helical groove 61 in the periphery of the lens mount 63. As the mount 63 is rotated manually in one direction or the other, it and the lenses mounted therein will be moved toward or away from the stage plate 49, depending upon the direction of rotation of the lens mount, to move the magnifying lenses of the mount toward or from a slide carried by plate 49, thereby to vary the magnification of the slide. For fine adjustment of the lenses, the stud 65 may be rotated so that its detent 64 produces a slight axial shifting of the lens mount 63 toward or away from the plate 49.

Bracket 50 at its free end has rotatably mounted therein, above and parallel to arm 62, one end of a shaft 66. Secured to the outer, free end of shaft 66 is a mirror or reflector 67. A set screw 68 is threaded into the bracket 50 to lock shaft 66 against rotation once the mirror 67 has been adjusted into its desired position relative to lens mount 51.

Secured in casing 12 in position to engage and support the bracket 50, when the latter is pivoted with the stage 49 downwardly into inoperative position as shown in FIG. 3 is a sponge-rubber covered block 71. Secured by rivets 73 to one side of block 71, and projecting at its opposite end diagonally upwardly beyond the upper edge of the block to engage the bracket 50 when the latter is in its lower position, is a leaf spring 74. Adjacent its free, upper end spring 74 has a hole 75 therethrough through which a rigid pin 76 on the bracket 50 is adapted to project when the bracket is in its lowered position, thereby, to hold the bracket firmly on the block 71.

Hinged by hinges 78 on casing 12 to pivot into and out of the opening 46 is a rigid cover flap 79. When flap 79 is in horizontal position (FIG. 5) it may be made to engage the underside of the stage 49 to support the stage plate. In its horizontal position the flap 79 is supported by two lugs 80 which are riveted to the underside of plate 43 adjacent opposite sides, respectively, of the recess 46.

Beneath the plate 43 on one sidewall of the casing 12 is mounted a right angled bracket 81 (FIG. 6) from which is suspended by means of screws 82 and a spacer block 83 an electric motor 84. The armature shaft 85 (FIG. 6) of motor 84 extends downwardly and has secured thereto a multi-bladed fan 86. The blades of fan 86 are mounted to rotate in a horizontal plane just above the bottom of the casing 12 in registry with a circular opening 87 through the casing bottom. When the motor 84 is operating, the fan 86 draws air inwardly through the opening 87 and directs it upwardly. Secured behind bracket 81 to the adjacent casing wall is a sheet metal baffle plate 88. Plate 88 extends diagonally upwardly and inwardly of the casing above the fan 86 and terminates beneath and adjacent one side of the opening 46 in the plate 43. The baffle 88 directs incoming air inwardly toward the lamp 57. A screen 89 is stapled or otherwise secured to the inside of the casing 12 over the opening 87 to filter incoming air. A further, inverted, cup-shaped screen 90 surrounds the motor shaft 85 on the upper side of the fan 86. Screens 89 and 90 also serve to prevent accidental contact of one's hand with the rotating fan 86.

The side of casing 12 remote from the side upon which the fan 86 is mounted has therethrough a large rectangular opening 92 through which air blown across the casing by the fan 86 can pass out of the casing. A flat, rectangular screen 93 is secured to the side of the casing 12 over the opening 92 by stapling or otherwise.

Power is supplied to the fan motor 84 and the lamp 57 through a conventional electrical cord 94 (FIG. 4) which at one end is adapted to be connected to a power supply. A conventional switch, which is operated by a lever 96 carried by a switch plate 97 that is mounted on the upper face of the cover plate 43 (FIG. 4) controls the supply of current to the motor and lamp. The switch is connected through a transformer 98 (FIG. 4), mounted in the casing 12, to the lamp 57 so that both the fan motor 84 and lamp 57 are simultaneously energized when the button 96 is moved to its "on" position.

Figure 7:
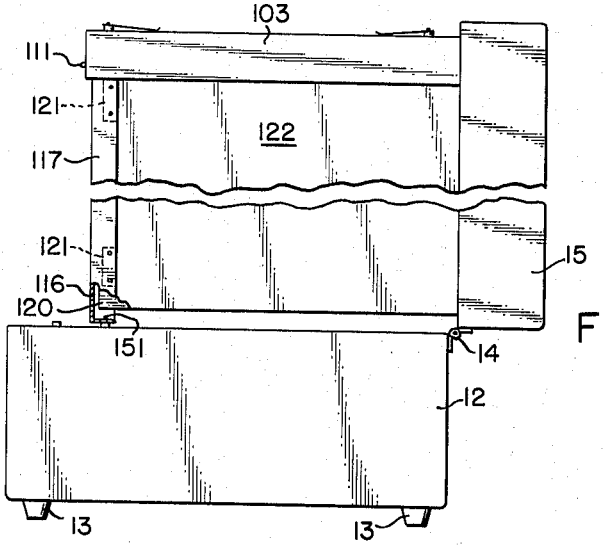
FIG. 7 is a view similar to FIG. 5, but showing the cover in an open, vertical position, and the projection screen in an alternate, operative position for copying or tracing the projected, magnified image.
Figure 8:
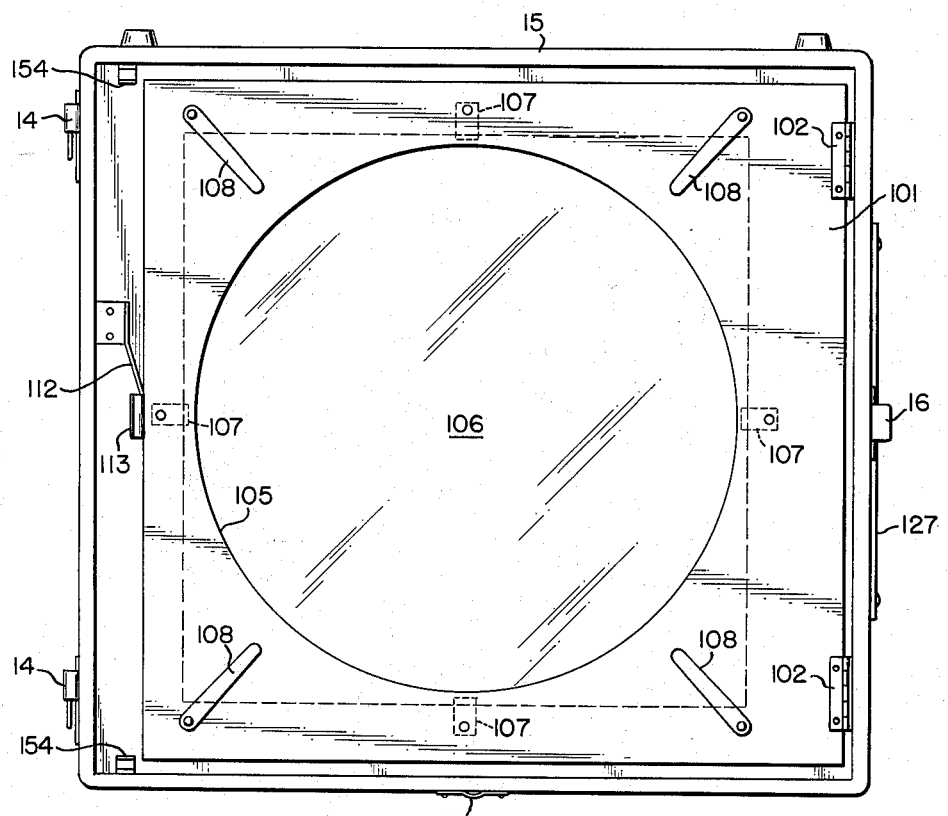
FIG. 8 is a plan view of the cover showing the screen stored therein.
Figure 9:
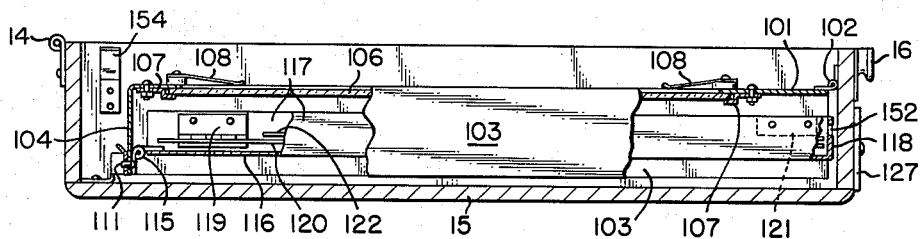
FIG. 9 is a vertical section through the cover and the screen stored therein.

Referring now to FIGS. 5 to 9, 101 designates a frame which is pivotally secured along one edge thereof by hinges 102 to the inside of the cover 15 so that, when the latter is open, the frame 101 may be pivoted clockwise upwardly from its horizontal position shown in FIGS. 8 and 9 to a vertical position as shown in FIGS. 5 and 6. Frame 101 is surrounded by parallel side walls 103 and a top 104. In its center, plate 101 has a large circular opening 105 (FIGS. 6 and 8) beneath which is secured a rectangular, glass projection screen 106 by means of four clamps 107 (FIG. 8). Four spring clamps 108 are secured to the upper side of plate 101 adjacent each of the four corners of the screen 106 in position to clamp a piece of tracing paper or the like onto screen 106. The upper surface of the screen 106 as shown in FIG. 9 is the roughened or image producing side of the screen.

Secured to and projecting from the outer face of the top wall 104 adjacent the lower edge thereof is a detent 111. Riveted or otherwise secured on the confronting wall of the cover 15 is a leaf spring 112 (FIGS. 8 and 9) which has a block 113 at its free end. Block 113 has therein an opening into which the detent 111 is adapted to project, when frame 101 is in inoperative position as shown in FIG. 9, to hold the frame in that position. Block 113 which is manually engageable to release spring 112 from the detent 111 when it is desired to elevate the plate 101.

Hinged along one edge thereof by hinges 115 (FIG. 8)

to the inside of wall 104 is a sheet metal plate 116 which has parallel side flanges 117 and an end flange 118.

Pivotally connected along one edge thereof to the inside of one of the side flanges 117 by means of a pair of hinges 119 located adjacent opposite ends, respectively, of the latter, is a rectangular sheet metal plate 120, which, in its inoperative position as shown in FIG. 9, is adapted to lie in a substantially horizontal plane immediately above the plate 116. Also pivotally mounted along one edge thereof to the inside of the other of the side flanges 117 of plate 116 by means of a pair of hinges 121 is a further sheet metal plate 122 (FIGS. 6 and 9). In inoperative position (FIG. 9) plate 122 is adapted to overlap plate 120 in a substantially horizontal plane. The plates 120 and 122 are adapted to swing 90° about their hinges relative to plate 116 when the projection screen is erected or collapsed.

For supporting the cover in horizontal position, foldable legs 125 and 126 (FIGS. 10 to 13) are provided. When the case is closed, these are housed behind an elongate, rectangular metal plate 127 which is secured by screws or rivets 128 to the forward side of cover 15. Beneath plate 127 the cover 15 is cut out to provide a rectangular recess 129 (FIG. 10). The legs 125 and 126 are mounted to pivot at one end in recess 129 on pins 130 and 131, respectively, which are secured in plate 127. The legs 125 and 126 have therethrough longitudinally extending slots 133 and 134, respectively and are connected together in overlapping sliding relation by a pin 135 and plastic washers 136. Pin 135 extends through the slots 133 and 134. Washers 139 (FIG. 10) space the legs properly on pins 130 and 131, respectively.

Secured by rivets 145 to the inner face of leg 126 adjacent the end thereof which pivots about pin 131 is an elongate leaf spring 146. Adjacent its opposite end spring 146 has secured to its inner face a circular detent 147. Adjacent its end remote from pin 130, leg 125 has therethrough a circular opening 148 (FIG. 12) which is adapted to register with the detent 147 when the legs 125 and 126 are pivoted manually downwardly into their lower positions, whereby detent 147 is free to pop into the hole 148 thereby to hold the legs 125 and 126 in extended, cover-supporting position. At such time the peripheral surfaces of the washers 136 provide a stationary foot or rest for supporting the cover 15 horizontally.

When the detent 147 is pressed out of the opening 148, the legs 125 and 126 can be pivoted manually upwardly about the pins 130 and 131, pin 135 traveling upwardly in the slots 133 and 134 in this movement until the washers 136 become seated in a recess 149 (FIG. 11) formed in the lower edge of the plate 127.

Figure 1:
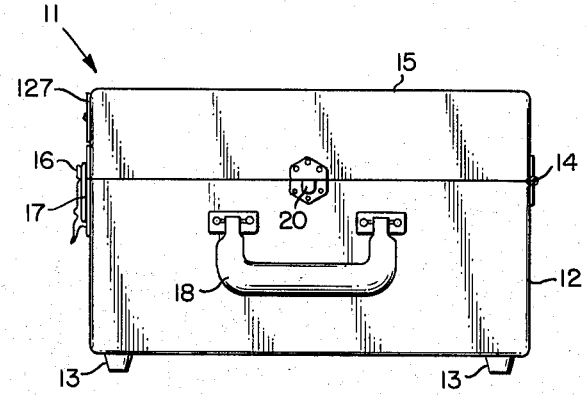
FIG. 1 is a side elevation of a microprojector carrying case made in accordance with one embodiment of this invention.
Figure 2:
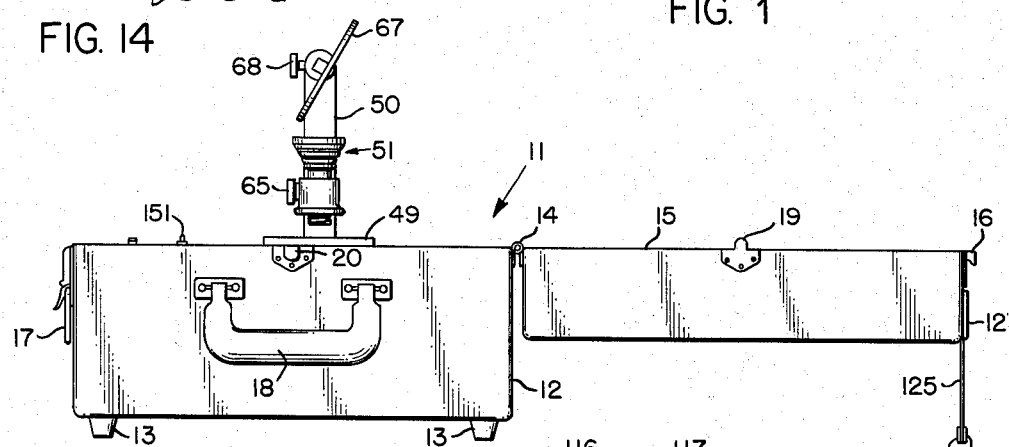
FIG. 2 is a side view showing the case with its cover open, and the projector erected.

Assuming that the carrying case 11 is in closed position, illustrated in FIG. 1, to use the apparatus, the clasp 17 is released from hook 16. The cover 15 is then pivoted about the hinges 14 to its horizontal position, and the legs 125 and 126 are extended, as shown in FIGS. 2 and 11 to support it there. Plate 101 is then pivoted (clockwise in FIG. 9) about the hinges 102 until it is disposed in a vertical position as shown in FIGS. 5 and 6. Plate 116 is then pivoted (clockwise in FIG. 9) about the hinges 115 until it extends outwardly perpendicular to plate 101. At this time, first the plate 120 and then the plate 122 will automatically drop downwardly by pivoting about their respective hinges 119 and 121. The lower edges of the plates 120 and 122 are then disposed within the upper, free ends of two spring clamps 154 (FIGS. 8 and 9) which are secured to the inside faces of the two sidewalls of cover 15. The glass screen 106 is thus supported in a vertical plane as shown in FIGS. 5 and 6.

The flap 79 is then pivoted (clockwise in FIG. 3) into a substantially vertical position about its hinges 78; and the stage plate 49 is then pivoted (counterclockwise in FIG. 3) slightly greater than 90° upwardly about its hinges 48. The flap 79 is then pivoted back into a horizontal position as shown in FIG. 4 so that it rests on the lugs 80; and the stage plate 49 is then pivoted down into a horizontal position until it rests upon flap 79 to be supported thereby as shown in FIGS. 5 and 6.

The switch 96 is then moved to its "on" position, and a slide is positioned beneath the clamps 58 on stage plate 49 so that its image will be projected by the lamp 57 toward the mirror 67. The lock nut 68 may be loosened and the mirror shaft 66 adjusted angularly until the mirror assumes a position such as that illustrated in FIGS. 5 and 6, wherein light from lamp 57 will be reflected onto vertically disposed screen 106. An image of the specimen contained on the slide is therefore projected onto screen 106 to be viewed by the class.

Alternatively, if it is desired to trace the image projected on the screen 106, or for any other reason it is desired to view the latter from above, the lock nut 68 may be loosened, and the mirror shaft 66 removed from the bracket 50. With the mirror 67 thus removed, cover 15 may then be pivoted (counterclockwise from its position shown in FIG. 5) until the end wall 118 integral with the plate 116 is swung downwardly into juxtaposition with the plate 43 as shown in FIG. 7. To support the cover in this position, two plastic studs 151 (FIGS. 3 and 6) are secured to the upper face of plate 43 adjacent opposite sides thereof. The upper ends of these studs are adapted to register with and enter two, spaced, circular openings 152 (FIG. 6) formed in the end wall 118.

When in use, the air drawn into the casing by the fan 86 will be directed by the baffle 88 into the axial space beneath the lamp 57 and the stage 49, therefore operating to conduct heat away from the filter 54 and out of the opening 92 in the opposite casing wall. The cover plate 43, the flaps 49 (stage), and 79 prevent this cooling air from flowing up and out through the recess 46 in the cover plate 43, therefore producing a more efficient cooling effect, and preventing any undesirable flow of air from the fan from interfering with any specimens carried on the slide which is being projected.

In its operative position, the stage plate 49 remains in a stationary, horizontal position, and if it is desired to change the direction in which the image is projected, one need only adjust the mirror 67, or remove it entirely if the projection screen is to be employed in the position shown in FIG. 7.

With the more effective cooling afforded by applicants' novel casing and fan mounting, it has been found that live specimens do not tend to overheat and cook when the unit is in operation. Moreover, unlike most prior microprojector units, it has been found that applicants' relatively compact unit functions very well with a 50 watt projection lamp rather than the hotter, more conventional 100 watt lamp. Also, by employing a zoom type lens adjustment, a continuously variable magnification of a slide may be obtained.

When not in use, the microscope and its supporting plate 49 are folded down into the casing, and the screen 106 is folded into the cover 15, as shown in FIG. 3. The supporting legs 125 and 126 are readily collapsed by depressing the button 147 and pivoting the legs 125 and 126 into the recess 129.

From the foregoing, it will be apparent that applicants have provided a compact microprojector unit which is relatively inexpensive to manufacture, and which is highly efficient in use as compared to prior devices. Moreover, an operator can change slides and point out pertinent parts of the projected images without having to pass back and forth between the projector and a screen remote therefrom, and without having to call upon students to view the image one at a time.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:
1. A microprojector comprising
   (a) a case having a bottom section and a cover hinged to said bottom section for movement from closed position to a fully open position,
   (b) a projection screen collapsibly mounted in said cover and movable when said cover is open, from a collapsed position in which it is disposed entirely within said cover to an erected position,
   (c) slide projection means mounted in said bottom section for movement, when said cover is open, from an inactive position in which said projection means is disposed within said bottom section to an erect active position, said projection means being operative in its erect position to direct the image of a slide onto said screen when the latter is in its erected position,
   (d) said bottom section and said cover being generally rectangular in configuration,
   (e) said cover being hinged along one side thereof to one side of said bottom section,
   (f) said screen adjacent one side edge thereof being hinged to the opposite side of said cover to pivot for at least 90° about an axis, which extends parallel to the hinge axis of said cover,
   (g) a rectangular panel being hinged adjacent one of its edges to the opposite side edge of said screen to pivot between an inactive position parallel to said screen, and an active position in which it extends normal to said screen, and
   (h) said cover being pivotable 90° from its fully open position toward its closed position, thereby to position said screen above said bottom section and in registry with said projecting means, and so that said panel in its active position projects downwardly from said screen to support said screen from said bottom section.

2. A microprojector as defined in claim 1, wherein
   (a) two further, rectangular panels are hingedly connected, respectively, to opposite side edges of the first-named panel to pivot 90° between inactive positions parallel to said first-named panel, and active positions in which they extend normal to said first-named panel and said screen, and including
   (b) means on said cover releasably to engage and support said further panels along the edges thereof opposite to their hinged edges, when said further panels are in their active positions and said cover is in its fully open position, thereby to support said first-named panel above said cover with said screen in an active position in which it extends normal to the top of said cover, and
   (c) a mirror removably connected to said projection means to direct an image, which is projected by said projection means, onto said screen when it is disposed in the last-named active position.

3. A microprojector comprising
   (a) a case having a bottom section and a cover hinged to said bottom section for movement from closed position to a fully open position,
   (b) a projection screen collapsibly mounted in said cover and movable when said cover is open, from a collapsed position in which it is disposed entirely within said cover to an erected position,
   (c) slide projection means mounted in said bottom section for movement, when said cover is open, from an inactive position in which said projection means is disposed within said bottom section to an erect active position, said projection means being operative in its erect position to direct the image of a slide onto said screen when the latter is in its erected position,
   (d) a plate secured over said bottom section and having an opening therethrough communicating with the interior of said bottom section,
   (e) a stage hingedly connected to said plate to pivot in and out of said opening, said stage having an opening therethrough over which a slide, which is to be projected, is secured removably,
   (f) a bracket secured at one end to one side of said stage, and
   (g) a mirror removably connected to said bracket, and said projecting means comprising
   (h) a microscope which is mounted on said bracket intermediate said stage and said mirror, and
   (i) a projection lamp mounted beneath said stage in registry with the opening therein and with said microscope, when said stage is pivoted upwardly out of the opening in said plate, for projecting the image of a slide through said microscope and onto said mirror.

4. A microprojector comprising
   (a) a casing,
   (b) a stage mounted on said casing and having an opening therethrough,
   (c) a projection lamp mounted on one side of said stage in spaced relation thereto and in registry with said opening,
   (d) a microscope carried by a bracket on the opposite side of said stage with its lenses in registry with said lamp,
   (e) means for mounting a specimen slide on said stage over said opening for projection by said lamp into the lenses of said microscope,
   (f) said casing having therethrough an air inlet port and an air outlet port adjacent opposite sides thereof, respectively,
   (g) a fan mounted in said casing adjacent said inlet port and operable to draw air into said casing,
   (h) a baffle plate mounted in said casing adjacent said fan and operative, when said fan is operating, to direct air from said fan into the space between said lamp and said stage and toward said outlet port,
   (i) a heat filter mounted across the opening in said stage above said lamp, and
   (j) said baffle being operative to direct the flow of air from said fan onto said filter.

5. A microprojector comprising
   (a) a casing,
   (b) a stage mounted on said casing and having an opening therethrough,
   (c) a projection lamp mounted on one side of said stage in spaced relation thereto and in registry with said opening,
   (d) a microscope carried by a bracket on the opposite side of said stage with its lenses in registry with said lamp,
   (e) means for mounting a specimen slide on said stage over said opening for projection by said lamp into the lenses of said microscope,
   (f) said casing having therethrough an air inlet port and an air outlet port adjacent opposite sides thereof, respectively,
   (g) a fan mounted in said casing adjacent said inlet port and operable to draw air into said casing,
   (h) a baffle plate mounted in said casing adjacent said fan and operative, when said fan is operating, to direct air from said fan into the space between said lamp and said stage and toward said outlet port,
   (i) a cover plate secured over said casing and has therein an opening larger than said stage,
   (j) said stage being hinged along one edge thereof to said cover plate to pivot through the opening in said cover plate between an inactive position in which it extends into the casing interior, and an active position in which it extends above said cover plate.

6. A microprojector comprising
(a) a casing,
(b) a stage mounted on said casing and having an opening therethrough,
(c) a projection lamp mounted on one side of said stage in spaced relation thereto and in registry with said opening,
(d) a microscope carried by a bracket on the opposite side of said stage with its lenses in registry with said lamp,
(e) means for mounting a specimen slide on said stage over said opening for projection by said lamp into the lenses of said microscope,
(f) said casing having therethrough an air inlet port and an air outlet port adjacent opposite sides thereof, respectively,
(g) a fan mounted in said casing adjacent said inlet port and operable to draw air into said casing,
(h) a baffle plate mounted in said casing adjacent said fan and operative, when said fan is operating, to direct air from said fan into the space between said lamp and said stage and toward said outlet port,
said microscope comprising
(i) a cylindrical lens carrying member mounted on said bracket in alignment with the opening in said stage,
(j) said member having an axially extending helical groove in its peripheral surface,
(k) an adjusting member rotatably journaled in said bracket normal to the first-named member, and
(l) a pin on the inner end of the second-named member radially offset from its axis of rotation, and projecting into said groove to cause the axial shifting of said first-named member upon the rotation of either of said members.

7. A microprojector comprising
(a) a casing,
(b) a stage mounted on said casing and having an opening therethrough,
(c) a projection lamp mounted on one side of said stage in spaced relation thereto and in registry with said opening,
(d) a microscope carried by a bracket on the opposite side of said stage with its lenses in registry with said lamp,
(e) means for mounting a specimen slide on said stage over said opening for projection by said lamp into the lenses of said microscope,
(f) said casing having therethrough an air inlet port and an air outlet port adjacent opposite sides thereof, respectively,
(g) a fan mounted in said casing adjacent said inlet port and operable to draw air into said casing,
(h) a baffle plate mounted in said casing adjacent said fan and operative, when said fan is operating, to direct air from said fan into the space between said lamp and said stage and toward said outlet port,
(i) a cover hinged to said casing to pivot from a closed position over said casing to an open position in which the cover is positioned in side by side relation to said casing,
(j) a collapsible support on said cover for supporting the latter in its open position,
(k) a projection screen hinged to said cover to pivot between an inactive position entirely within said cover and an active position in which said screen projects out of said cover, and
(l) a reflector mounted on said bracket to register with the lenses in said microscope and with said screen, when the latter is in its active position.

8. A microprojector as defined in claim 7 wherein
(a) said screen pivots about a first axis parallel to the hinge axis of said cover,
(b) a first, rigid panel is hinged to said screen for pivotal movement about a second axis parallel to and spaced from said first axis, and
(c) two further, rigid panels are hinged to opposite sides, respectively, of said first panel to pivot about spaced parallel axes which extend transverse to said first and second axes, and
(d) said panels are pivotal between inactive positions in which they are disposed in said cover in parallel juxtaposition with said screen, when the latter is in its inactive position, and active positions in which said first panel extends normal to said screen, and said further panels extend between said first panel and said cover to support said screen in its active position with said first panel disposed in parallel to and above said cover.

9. A microprojector as defined in claim 7 wherein said support comprises
(a) a pair of levers, each of which is pivotally mounted at one end on one side of said cover in laterally spaced relation to one another, and each of which has therethrough an elongate slot adjacent its opposite end,
(b) said levers are pivotable between an inactive position in which they extend parallel to one another with said opposite ends thereof disposed in overlapping, side-by-side relationship and in juxtaposition to said side of said cover, and an active position in which their slotted ends project below the open cover to support the cover,
(c) a pin extending through said slots and slidable longitudinally thereof upon the pivoting of said levers, and
(d) a manually releasable spring detent carried by one of said levers and engageable in a recess in the other of said levers to hold said levers against pivotal movement when they are in their active positions.

10. A microprojector as defined in claim 9 wherein
(a) a pair of plastic rollers are secured, respectively, to opposite ends of said pin, and
(b) the peripheral surfaces of said rollers project beyond said opposite ends of said levers to support said levers.

11. A microprojector comprising
(a) a casing having
(b) a bottom section and
(c) a cover section hingedly connected at one of its sides to said bottom section at one side thereof, said cover being pivotal between a closed position in which it overlies said bottom section, an intermediate position in which it extends at an angle of 90° to said bottom section, and a full open position in which it extends at an aangle of 180° to said bottom section,
(d) a plate extending over said bottom section,
(e) a projection lamp housed in said bottom section beneath said plate,
(f) a stage carried by said plate and having an opening therethrough registering with said lamp,
(g) means for holding a specimen slide on said stage over said opening,
(h) a microscope,
(i) means for mounting said microscope above said stage in alignment with said opening,
(j) a projection screen hinged to said cover along the side of said cover remote from and oposite to the side thereof which is hinged to said bottom section, whereby said screen may be pivoted from an inactive position within said cover to an active position projecting from said cover normal thereto, when said cover is open,
(k) a panel hinged to said screen along the edge of said screen which is opposite that along which the screen is hinged to said cover thereby to be movable between a position parallel to said screen and a position normal thereto, (l) a further pair of panels hinged to the first-named panel along opposite side edges of said first-named panel, respectively, to hinge about axes normal to the axis of swing of said first-named panel, the two last-named panels serving to engage said cover and to support said screen in its active position, (m) said screen comprising a ground glass portion overlying said microscope when said cover section is in its intermediate position to permit tracing the image projected by said microscope onto said screen, and (o) means for supporting a reflector above said microscope, when said cover section is fully open to project an image from said microscope onto said screen.

12. A microprojector comprising
(a) a casing having
(b) a bottom section and
(c) a cover section hingedly connected at one of its sides to said bottom section at one side thereof, said cover being pivotal between a closed position in which it overlies said bottom section, an intermediate position in which it extends at an angle of 90° to said bottom section, and a full open position in which it extends at an angle of 180° to said bottom section,
(d) a collapsible projection screen hinged to said cover along the side thereof remote from and opposite to said one side of said cover to pivot from an inactive position within said cover to an active position normal to said cover,
(e) means in said bottom section for projecting the image of a slide onto said screen when it is in its active position and
(f) means for supporting said screen in a first active position in which it is disposed in a plane above and parallel to said bottom section, when said cover is in its intermediate position, and a second active position in which it is disposed in a plane spaced from and extending at an angle of 90° to said bottom section, when said cover is in its fully open position,
(g) said screen including a ground glass portion for providing a tracing surface when said screen is in said first active position.

13. A microprojector as defined in claim 12 wherein said projecting means comprises
(a) a microscope for focusing an image directly on said screen when it is in its first active position, and
(b) a reflector removably mounted on said bottom section to register with said microscope and to project an image therefrom onto said screen when the latter is in its second active position.

References Cited by the Examiner

UNITED STATES PATENTS

| | | | |
|---|---|---|---|
| 2,351,753 | 6/1944 | Flint et al. | 88—24 X |
| 2,424,339 | 7/1947 | Stechbart et al. | 88—24 |
| 2,863,356 | 12/1958 | Goldberg | 88—240 |

NORTON ANSHER, *Primary Examiner.*

H. H. FLANDERS, *Assistant Examiner.*